Patented Jan. 29, 1946

2,393,754

UNITED STATES PATENT OFFICE 2,393,754

REACTION PRODUCTS OF ALDEHYDES AND TRIAZINE DERIVATIVES

Gaetano F. D'Alelio and James W. Underwood, Pittsfield, Mass., assignors to General Electric Company, a corporation of New York No Drawing. Application July 30, 1942,
Serial No. 452,890

23 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, dimethylol urea, trimethylol melamine, etc., and a triazine derivative corresponding to the following general formula:

I 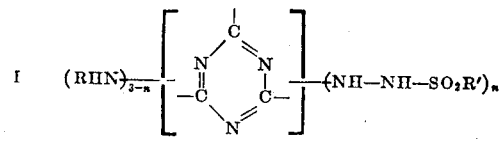

In the above formula $n$ represents an integer and is at least 1 and not more than 3, R represents a member of the class consisting of hydrogen and monovalent hydrocarbon and substituted hydrocarbon radicals, more particularly halo-hydrocarbon radicals, and R' represents a member of the class consisting of aryl radicals and substituted aryl radicals, more particularly halo-aryl radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butyl-phenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, iodophenyl, fluorophenyl, bromotolyl, etc.

Illustrative examples of aryl and substituted aryl radicals that R' in Formula I may represent are: phenyl, diphenyl, naphthyl, anthracyl, tolyl, xylyl, ethylphenyl, propylphenyl, isopropylphenyl, allylphenyl, 2-butenylphenyl, tertiary-butylphenyl, methylnaphthyl, ethylnaphthyl, iodophenyl, chlorophenyl, bromophenyl, fluorophenyl, chlorotolyl, bromotolyl, chloroxylyl, dichlorophenyl, iodotolyl, propenylphenyl, etc.

Preferably R in Formula I is hydrogen and $n$ represents 1. The general formula for such a compound is:

II 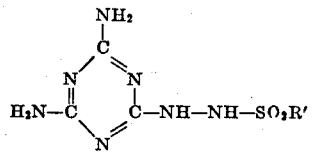

where R' has the meaning above given with reference to Formula I. Preferably R' in Formulas I and II is either a phenyl radical or a tolyl radical.

Instead of the symmetrical triazines (s-triazines) represented by the above formulas, corresponding derivatives of the asymmetrical triazines or of the vicinal triazines may be used.

The triazine derivatives that are used in carrying the present invention into effect are more fully described and are specifically claimed in our copending application Serial No. 452,891, filed concurrently herewith and assigned to the same assignee as the present invention. As pointed out in this copending application, a method of preparing the triazine derivatives used in carrying the present invention into effect comprises effecting reaction in the presence of a hydrohalide acceptor, e. g., a tertiary base such as trialkyl and triaryl amines, between (1) a hydrazino triazine corresponding to the general formula

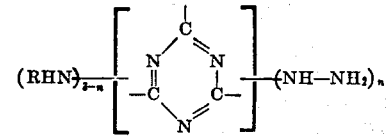

where $n$ and R have the same meanings as given above with reference to Formula I, and (2) a compound corresponding to the general formula

where X represents a halogen selected from the class consisting of chlorine, bromine and iodine, and $n$ and R' have the same meanings as given above with reference to Formula I. Examples of these triazine derivatives are the mono-(aryl sulfonyl hydrazino) diamino s-triazines, e. g., (benzene sulfonyl hydrazino) diamino s-triazine, etc., the monoamino di-(aryl sulfonyl hydrazino) s-triazines, e. g., monoamino di-(benzene sulfonyl hydrazino) s-triazines, etc., the tri-(aryl sulfonyl hydrazino) s-triazines, e. g., tri-(benzene sulfonyl hydrazino) s-triazine, etc. More specific examples of triazine derivatives embraced by Formula I that may be used in producing our new condensation products are listed below:

(Benzene sulfonyl hydrazino) di-(methylamino) s-triazine
(Toluene sulfonyl hydrazino) diamino s-triazine
(Chlorobenzene sulfonyl hydrazino) diamino s-triazine
(Bromotoluene sulfonyl hydrazino) diamino s-triazine
(Iodobenzene sulfonyl hydrazino) di-(methylamino) s-triazine
(Fluorobenzene sulfonyl hydrazino) di-(ethylamino) s-triazine
(Benzene sulfonyl hydrazino) di-(cyclohexylamino) s-triazine
(Toluene sulfonyl hydrazino) di-(cyclohexenylamino) s-triazine
(Benzene sulfonyl hydrazino) di-(propylamino) s-triazine
2-(toluene sulfonyl hydrazino) 4-ethylamino 6-amino s-triazine
2-(xylene sulfonyl hydrazino) 4-propylamino 6-anilino s-triazine
(Benzene sulfonyl hydrazino) di-(benzylamino) s-triazine
(Toluene sulfonyl hydrazino) di-(allylamino) s-triazine
2-(benzene sulfonyl hydrazino) 4-allylamino 6-ethylamino s-triazine
(Benzene sulfonyl hydrazino) di-(ethylamino) s-triazine
2-(benzene sulfonyl hydrazino) 4-methylamino 6-amino s-triazine
2-(benzene sulfonyl hydrazino) 4-anilino 6-amino s-triazine
2-(benzene sulfonyl hydrazino) 4-anilino 6-methylamino s-triazine
Amino di-(toluene sulfonyl hydrazino) s-triazine
Tri-(toluene sulfonyl hydrazino) s-triazine
(Xylene sulfonyl hydrazino) diamino s-triazine
Amino di-(xylene sulfonyl hydrazino) s-triazine
Tri-(xylene sulfonyl hydrazino) s-triazine
(Naphthalene sulfonyl hydrazino) diamino s-triazine
Amino di-(naphthalene sulfonyl hydrazino) s-triazine
Tri-(naphthalene sulfonyl hydrazino) s-triazine
(Toluene sulfonyl hydrazino) di-(methylamino) s-triazine
(Benzene sulfonyl hydrazino) dianilino s-triazine
(Xylene sulfonyl hydrazino) dianilino s-triazine
(Propylbenzene sulfonyl hydrazino) di-(pentylamino) s-triazine
(Propenylbenzene sulfonyl hydrazino) di-(isobutylamino) s-triazine
(Diethylbenzene sulfonyl hydrazino) ditoluido s-triazine
(Benzene sulfonyl hydrazino) di-(butenylamino) s-triazine
(Anthracene sulfonyl hydrazino) dixylidino s-triazine
(Toluene sulfonyl hydrazino) di-(naphthylamino) s-triazine
(Methyl ethyl benzene sulfonyl hydrazino) di-(phenethylamino) s-triazine
(Benzene sulfonyl hydrazino) di-(chloroanilino) s-triazine
(Toluene sulfonyl hydrazino) di-(bromotoluido) s-triazine
(Toluene sulfonyl hydrazino) di-(ethylanilino) s-triazine
(Toluene sulfonyl hydrazino) di-(cinnamylamino) s-triazine
2-(benzene sulfonyl hydrazino) 4-chloromethylamino 6-methylamino s-triazine
(Benzene sulfonyl hydrazino) di-(chloroethylamino) s-triazine
Di-(toluene sulfonyl hydrazino) 6-methylamino s-triazine
2-benzene sulfonylhydrazino 4-toluenesulfonylhydrazino 6-ethylbenzenesulfonylhydrazino s-triazine
(Toluene sulfonyl hydrazino) di-(iodoanilino) s-triazine The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and a triazine derivative of the kind embraced by Formula I, numerous examples of which have been given above and in the above-identified copending application.

In the production of molded articles from molding compositions comprising a filled or unfilled thermosetting resin, it is highly desirable that the molding compound have a high plastic flow during molding combined with a rapid cure to an insoluble and infusible state. Surprisingly it was found that the heat-curable resinous condensation products of this invention and molding compositions made therefrom show excellent flow characteristics during a short curing cycle. The molded articles have a high dielectric strength and very good resistance to arcing. They have a good surface finish and excellent resistance to water, being better, in general, than the ordinary urea-formaldehyde resins in this respect. The cured resins have a high resistance to heat and abrasion and, therefore, are especially suitable for use where optimum heat- and abrasion-resistance are properties of primary importance.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance, ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence or absence of solvents or diluents, other natural or synthetic resinous bodies, or while admixed with other materials that also can react with the aldehydic reactant or with the triazine derivative, e. g., urea ($NH_2CONH_2$), thiourea, selenourea, iminourea guanidine), substituted ureas, thioureas, selenoureas and iminoureas, e. g., aldehyde-reactable urea derivatives such as mentioned in D'Alelio Patent No. 2,285,418, issued June 9, 1042, page 1, column 1, lines 40–49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the triazine derivatives constituting the primary components of the resins of the present invention, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent No. 2,239,441, issued April 22, 1941; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the triazine derivative and the aldehyde to form an intercondensation product by mixing all the reactants and effecting condensation therebetween or by various permutations of reactants as described, for example, in D'Alelio Patent No. 2,281,559, issued May 5, 1942 (page 2, column 1, lines 49–69), with particular reference to reactions involving a non-haloacylated urea, a halogenated acylated urea and an aliphatic aldehyde. For instance, we may form a partial condensation product of ingredients comprising (1) urea or melamine or urea and melamine, (2) a triazine derivative of the kind embraced by Formula I, more particularly a mono-(aryl sulfonyl hydrazino) diamino s-triazine, e. g., (benzene sulfonyl hydrazino) diamino s-triazine, (toluene sulfonyl hydrazino) diamino s-triazine, etc., a monoamino di-(aryl sulfonyl hydrazino) s-triazine, e. g., monoamino di-(benzene sulfonyl hydrazino) s-triazine, etc., a tri-(aryl sulfonyl hydrazino) s-triazine, e. g., tri-(benzene sulfonyl hydrazino) s-triazine, and (3) an aldehyde, including polymeric aldehydes, hydroxyaldehydes and aldehyde-addition products, for instance formaldehyde, paraformaldehyde, glyceraldehyde, dimethylol urea, a polymethylol melamine, etc. Thereafter we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| (Benzene sulfonyl hydrazino) diamino s-triazine | 42.1 |
| Aqueous formaldehyde (approx. 37.1% HCHO) | 72.9 |
| Aqueous ammonia (approx. 28% $NH_3$) | 4.2 |
| Sodium hydroxide in 2.5 parts water | 0.05 |
| Chloroacetamide (monochloroacetamide) | 0.5 |

All of the above ingredients with the exception of the chloroacetamide were heated together under reflux at boiling temperature for 15 minutes. The chloroacetamide was now added to the resulting resinous syrup and heating under reflux was continued for an additional 5 minutes. A molding (moldable) composition was prepared from the liquid intercondensation product thereby obtained by mixing therewith 30.2 parts alpha cellulose in flock form and 0.2 part of a mold lubricant, specifically zinc stearate. The wet molding compound was dried at room temperature until sufficient moisture had been removed to provide a material that could be molded satisfactorily. A well-cured molded piece having a well-knit and homogeneous structure was obtained by molding a sample of the dried and ground molding compound for 3 minutes at 135° C. under a pressure of 2,000 pounds per square inch. The molded piece was highly resistant to water as shown by the fact that it absorbed only 0.18% by weight of water when immersed in boiling water for 15 minutes followed by immersion in cold water for 5 minutes. The molding compound showed very good plastic flow during molding.

Instead of using chloroacetamide (monochloroacetamide) in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, glycine, sulfamic acid, citric diamide, phenacyl chloride, etc.). Other examples of curing reactants that may be employed to accelerate or to effect the curing of the thermosetting or potentially thermosetting resins of this and other examples are given in various copending applications of one or both of us, for instance in D'Alelio copending applications Serial No. 346,962, filed July 23, 1940, now Patent No. 2,325,375, and Serial No. 354,395, filed August 27, 1940, now Patent No. 2,325,376, both of which applications issued on July 27, 1943, and are assigned to the same assignee as the present invention.

Example 2

Same as Example 1 with the exception that the ammonia was omitted. The resulting resinous syrup yielded a molding compound that showed somewhat better plastic flow during molding than the molding composition of Example 1. The molded article of this example also was well cured and had a low water-absorption value, absorbing only 0.16% by weight of water when tested for its water resistance as described under Example 1.

Example 3

| | Parts |
|---|---|
| (Benzene sulfonyl hydrazino) diamino s-triazine | 16.8 |
| Urea | 14.4 |
| Aqueous formaldehyde (approx. 37.1% HCHO) | 97.2 |
| Aqueous ammonia (approx. 28% NH₃) | 3.0 |
| Sodium hydroxide in 3 parts water | 0.06 |
| Chloroacetamide | 0.6 |

All of the above ingredients with the exception of the chloroacetamide were heated together under reflux at boiling temperature for 15 minutes. The chloroacetamide was now added and refluxing was continued for an additional 5 minutes. The resulting resinous syrup was mixed with 42.8 parts alpha cellulose and 0.2 part zinc stearate to form a molding compound. The wet molding composition was dried at 65° C. until sufficient moisture had been removed to provide a composition that could be molded satisfactorily. A sample of the dried and ground molding compound was molded for 3 minutes at 135° C. under a pressure of 2,000 pounds per square inch. The molded piece was well cured and had a homogeneous and well-knit structure. It absorbed only 1.1% by weight of water when tested for its water-resistance characteristics as described under Example 1. The molding compound showed excellent plastic flow during molding.

Example 4

| | Parts |
|---|---|
| (Benzene sulfonyl hydrazino) diamino s-triazine | 42.3 |
| Para-ureido benzene sulfonamide | 32.2 |
| Aqueous formaldehyde (approx. 37.1% HCHO) | 97.2 |
| Sodium hydroxide in 4.5 parts water | 0.09 |
| Chloroacetamide | 0.9 |

The above ingredients were caused to react as described in the preceding examples, yielding a resinous syrup that was mixed with 57.2 parts alpha cellulose and 0.2 part zinc stearate to form a molding compound. A sample of the wet molding composition was dried at 60° C. until sufficient moisture had been removed to provide a material that could be molded satisfactorily. A well-cured molded piece having good cohesive characteristics and excellent water resistance was obtained by molding a sample of the dried and ground molding compound as described in Example 3. The molded piece absorbed only 0.28% by weight of water when tested for its water resistance as described under Example 1. The molding composition of this example also showed excellent plasticity during molding.

Example 5

| | Parts |
|---|---|
| (Benzene sulfonyl hydrazino) diamino s-triazine | 42.3 |
| Dimethylol urea (commercial grade containing approx. 11% by weight of water) | 100.6 |
| Sodium hydroxide in 3 parts water | 0.06 |
| Water | 200.0 |
| Choloacetamide | 0.6 |

All of the above ingredients with the exception of the chloroacetamide were heated together under reflux at boiling temperature for 15 minutes. The chloroacetamide was now added and refluxing was continued for an additional 5 minutes. The resulting resinous syrup was mixed with 40.9 parts alpha cellulose and 0.2 part zinc stearate to form a molding compound. The wet molding composition was dried as described under Example 4. A well-cured molded piece having a homogeneous and well-knit structure was obtained by molding a sample of the dried and ground molding compound in the same manner as described under Example 3. The molded article absorbed only 0.98% by weight of water when tested for its water-resistance characteristics as described under Example 1. The plastic flow of the molding compound during molding was very good.

Example 6

| | Parts |
|---|---|
| (Benzene sulfonyl hydrazino) diamino s-triazine | 42.2 |
| Acrolein | 33.6 |
| Aqueous ammonia (approx. 28% NH₃) | 4.0 |
| Sodium hydroxide in 2 parts water | 0.04 |
| Water | 200.0 |

The above ingredients were mixed together, the acrolein being added last. Reaction between the components started immediately. The evolution of heat was accompanied by a quick precipitation of a resinous material. When a sample of this resin was heated on a 140° C. hot plate, it cured to an infusible mass in the absence of a curing agent.

*Example 7*

| | Parts |
|---|---|
| (Benzene sulfonyl hydrazino diamino s-triazine | 42.2 |
| Butyl alcohol | 55.5 |
| Aqueous formaldehyde (approx. 37.1% HCHO) | 48.6 |
| Sodium hydroxide in 3.5 parts water | 0.07 | were heated together under reflux at the boiling temperature of the mass for 15 minutes. The resulting resinous syrup was potentially heat-curable as shown by the fact that when chloroacetamide, sulfamic acid, glycine or other curing agent such as mentioned under Example 1 was added to the resinous syrup, followed by heating on a 140° C. hot plate, the syrup cured to an insoluble and infusible resinous composition. The plasticity of the resin during curing was very good. The syrupy condensation product as initially obtained was dehydrated by heating it on a steam plate. The dehydrated syrup was soluble in ethyl alcohol, dioxane and ethylene glycol but was insoluble in benzene and Solvatone. The solubility and film-forming characteristics of the resinous composition of this example make it especially suitable for use in the preparation of coating and impregnating compositions. For example, it may be used in the production of spirit and baking varnishes. It may be employed as a modifier of varnishes of the aminoplast and alkyd-resin types.

*Example 8*

| | Parts |
|---|---|
| (Benzene sulfonyl hydrazino) diamino s-triazine | 42.2 |
| Acetamide | 8.8 |
| Aqueous formaldehyde (approx. 37.1% HCHO) | 72.9 |
| Sodium hydroxide in 2.5 parts water | 0.05 | were heated together under reflux at the boiling temperature of the mass for 16 minutes, yielding a clear, viscous syrup that was converted into a thermoplastic resin when a sample of it was heated on a 140° C. hot plate. The addition of chloroacetamide, nitrourea, glycine or other curing agent such as mentioned under Example 1, either to the resinous syrup or to the thermoplastic resin, yielded a heat-curable composition that cured to an insoluble and infusible state when heated on a 140° C. hot plate.

*Example 9*

| | Parts |
|---|---|
| (Benzene sulfonyl hydrazino) diamino s-triazine | 42.2 |
| Diethyl malonate | 12.0 |
| Aqueous formaldehyde (approx. 37.1% HCHO) | 72.9 |
| Sodium hydroxide in 3 parts water | 0.06 | were heated together under reflux at boiling temperature for 15 minutes. The resulting resinous syrup cured quickly to an insoluble and infusible state when samples of it were treated with a small amount of chloroacetamide, nitrourea, oxamide, phthalic acid or other curing agent such as mentioned under Example 1, followed by heating on a 140° C. hot plate.

*Example 10*

| | Parts |
|---|---|
| (Benzene sulfonyl hydrazino) diamino s-triazine | 42.2 |
| Glycerine | 13.8 |
| Aqueous formaldehyde (approx. 37.1% HCHO) | 72.9 |
| Sodium hydroxide in 3 parts water | 0.06 | were heated together under reflux at boiling temperature for 15 minutes. The resulting resinous syrup was dehydrated by heating it on a steam plate. The dehydrated syrup was soluble in ethylene glycol and diethylene glycol monoethyl ether but was insoluble in ethyl alcohol, benzene and Solvatone. The addition of chloroacetamide or other curing agent such as mentioned under Example 1, either to the initial condensation product or to the dehydrated syrup, yielded a composition that cured to an insoluble and infusible state when a sample of it was heated on a 140° C. hot plate.

*Example 11*

| | Parts |
|---|---|
| (Benzene sulfonyl hydrazino) diamino s-triazine | 42.2 |
| Polyvinyl alcohol | 39.6 |
| Aqueous formaldehyde (approx. 37.1% HCHO) | 72.9 | were heated together under reflux at boiling temperature for 15 minutes. The resulting resinous syrup was potentially heat-curable as evidenced by the fact that when a small amount of chloroacetamide or other curing agent such as mentioned under Example 1 was added to the syrup, followed by heating on a 140° C. hot plate, the syrup cured to an infusible mass. A somewhat better cured product was obtained by using a small amount of hydrochloric acid in place of chloroacetamide. Two samples of the syrupy condensation product, one of which contained a small amount of hydrochloric acid as a curing agent, were applied to glass plates and the coated plates then were baked at 60° C. for 2 hours. The syrup that contained the hydrochloric acid yielded a transparent, hard, somewhat brittle coating while the unmodified syrup gave a hard, transparent, somewhat thermoplastic, baked film.

It will be understood, of course, by those skilled in the art that the reaction between the aldehyde and the triazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1–5 and 7–11 under reflux at the boiling temperature of the reaction mass, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that our invention is not limited to condensation products obtained by reaction of ingredients comprising an aldehyde and the specific triazine derivative embraced by Formula I that is named in the above illustrative examples. Thus, instead of (benzene sulfonyl hydrazino) diamino s-triazine, we may use, for example, (toluene sulfonyl hydrazino) diamino s-triazine, (chloro-, bromo-, fluoro- or iodo-benzene sulfonyl hydrazino) diamino s-triazine, monoamino di-(benzene sulfonyl hydrazino) s-triazine, tri-(benzene sulfonyl hydrazino) s-triazine, monoamino di-(toluene sulfonyl hydrazino) s-triazine, tri-(toluene sulfonyl hydrazino) s-triazine, or any other compound of the kind embraced, for example, by Formula I, numerous examples of which have been given hereinbefore and in our copending application Serial No. 452,891.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives of urea, thiourea, selenourea and iminourea, and of substituted ureas, thioureas, selenoureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminodiazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methylol melamines). Mixtures of aldehydes and aldehyde-addition products may be used, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending upon the particular properties desired in the finished product. Ordinarily these reactants are employed in an amount corresponding to at least one mol of the aldehyde, specifically formaldehyde, for each mol of the triazine derivative. Thus, we may use, for example, from 1 to 7 or 8 or more mols of an aldehyde for each mol of the triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 15 or 20 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones, etc.; nitriles, including halogenated nitriles, e. g., acrylonitrile, methacrylonitrile, succinonitrile, chloroacetonitriles, etc.; acylated ureas, more particularly halogenated acylated ureas of the kind described, for example, in D'Alelio Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, aminotriazole-aldehyde condensation products, melamine-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a triazine derivative of the kind embraced by Formula I and an aldehyde, specifically formaldehyde, we may cause an aldehyde to condense with a salt (organic or inorganic) of the triazine derivative or with a mixture of the triazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, oxalic, polyacrylic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a compound corresponding to the general formula

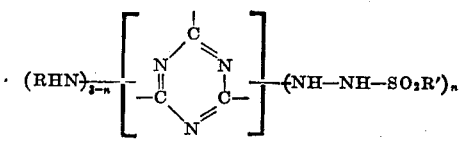

where $n$ represents an integer and is at least 1 and not more than 3, R represents a member of the class consisting of hydrogen and monovalent hydrocarbon and halo-hydrocarbon radicals, and R' represents a member of the class consisting of aryl and halo-aryl radicals.

2. A composition as in claim 1 wherein the aldehyde is formaldehyde.

3. A composition as in claim 1 wherein the reaction product is an alkaline-catalyzed reaction product of the stated components.

4. A composition as in claim 1 wherein the reaction product is an alcohol-modified reaction product of the stated components.

5. A composition as in claim 1 wherein R represents hydrogen and R' represents an aryl radical.

6. A heat-curable resinous composition comprising a heat-convertible condensation product of ingredients comprising formaldehyde and a mono-(aryl sulfonyl hydrazino) diamino s-triazine.

7. A product comprising the cured resinous composition of claim 6.

8. A composition comprising the resinous condensation product of ingredients comprising an aldehyde and a mono-(aryl sulfonyl hydrazino) diamino s-triazine.

9. A composition comprising the resinous condensation product of ingredients comprising an aldehyde and (benzene sulfonyl hydrazino) diamino s-triazine.

10. A resinous composition comprising the condensation product of ingredients comprising formaldehyde and (benzene sulfonyl hydrazino) diamino s-triazine.

11. A resinous composition comprising the condensation product of ingredients comprising formaldehyde and (toluene sulfonyl hydrazino) diamino s-triazine.

12. A composition comprising the resinous condensation product of ingredients comprising an aldehyde and a monoamino di-(aryl sulfonyl hydrazino) s-triazine.

13. A composition comprising the product of reaction of ingredients comprising a urea, an aldehyde and a compound corresponding to the general formula

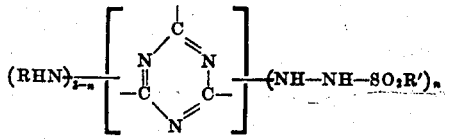

where $n$ represents an integer and is at least 1 and not more than 3, R represents a member of the class consisting of hydrogen and monovalent hydrocarbon and halo-hydrocarbon radicals, and R' represents a member of the class consisting of aryl and halo-aryl radicals.

14. A composition as in claim 13 wherein the urea component is the compound corresponding to the formula $NH_2CONH_2$ and the aldehyde is formaldehyde.

15. A resinous composition comprising the product of reaction of ingredients comprising urea, formaldehyde and (benzene sulfonyl hydrazino) diamino s-triazine.

16. A composition comprising the product of reaction of ingredients comprising melamine, an aldehyde and a compound corresponding to the general formula

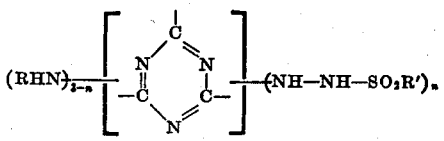

where $n$ represents an integer and is at least 1 and not more than 3, R represents a member of the class consisting of hydrogen and monovalent hydrocarbon and halo-hydrocarbon radicals, and R' represents a member of the class consisting of aryl and halo-aryl radicals.

17. A resinous composition comprising the product of reaction of ingredients comprising melamine, formaldehyde and (benzene sulfonyl hydrazino) diamino s-triazine.

18. A heat-curable composition comprising the heat-convertible resinous reaction product of (1) a partial condensation product of ingredients comprising formaldehyde and a mono-(aryl sulfonyl hydrazino) diamino s-triazine, and (2) a curing reactant.

19. A heat-curable composition comprising the heat-convertible resinous reaction product of (1) a partial condensation product of ingredients comprising dimethylol urea and an (aryl sulfonyl hydrazino) diamino s-triazine, and (2) a chlorinated acetamide.

20. The method of preparing new synthetic compositions which comprises effecting reaction between ingredients comprising an aldehyde and a compound corresponding to the general formula

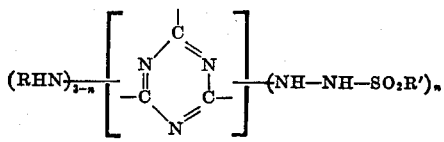

where $n$ represents an integer and is at least 1 and not more than 3, R represents a member of the class consisting of hydrogen and monovalent hydrocarbon and halo-hydrocarbon radicals, and R' represents a member of the class consisting of aryl and halo-aryl radicals.

21. A composition comprising the resinous reaction product of (1) a chlorinated acetamide and (2) a product of partial reaction of ingredients including a mono-(aryl sulfonyl hydrazino) diamino s-triazine and formaldehyde.

22. A composition comprising the resinous reaction product of (1) a chlorinated acetamide and (2) a product of partial reaction under alkaline conditions of ingredients including mono-(benzene sulfonyl hydrazino) diamino s-triazine and formaldehyde.

23. A composition comprising the resinous reaction product of (1) chloroacetamide and (2) a product of partial reaction under alkaline conditions of ingredients including urea, mono-(benzene sulfonyl hydrazino) diamino s-triazine and formaldehyde.

GAETANO F. D'ALELIO.
JAMES W. UNDERWOOD.